Patented Dec. 29, 1925.

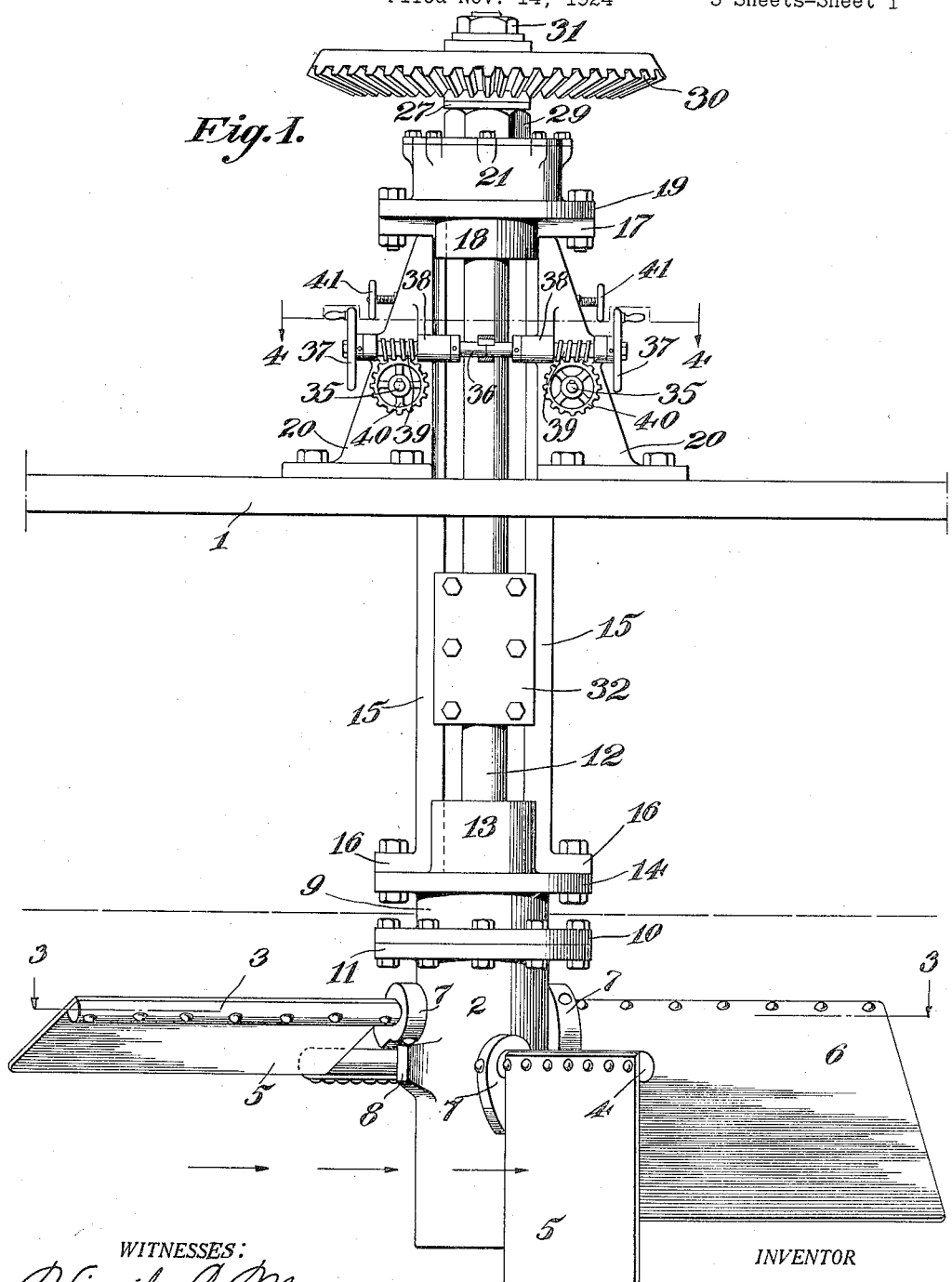

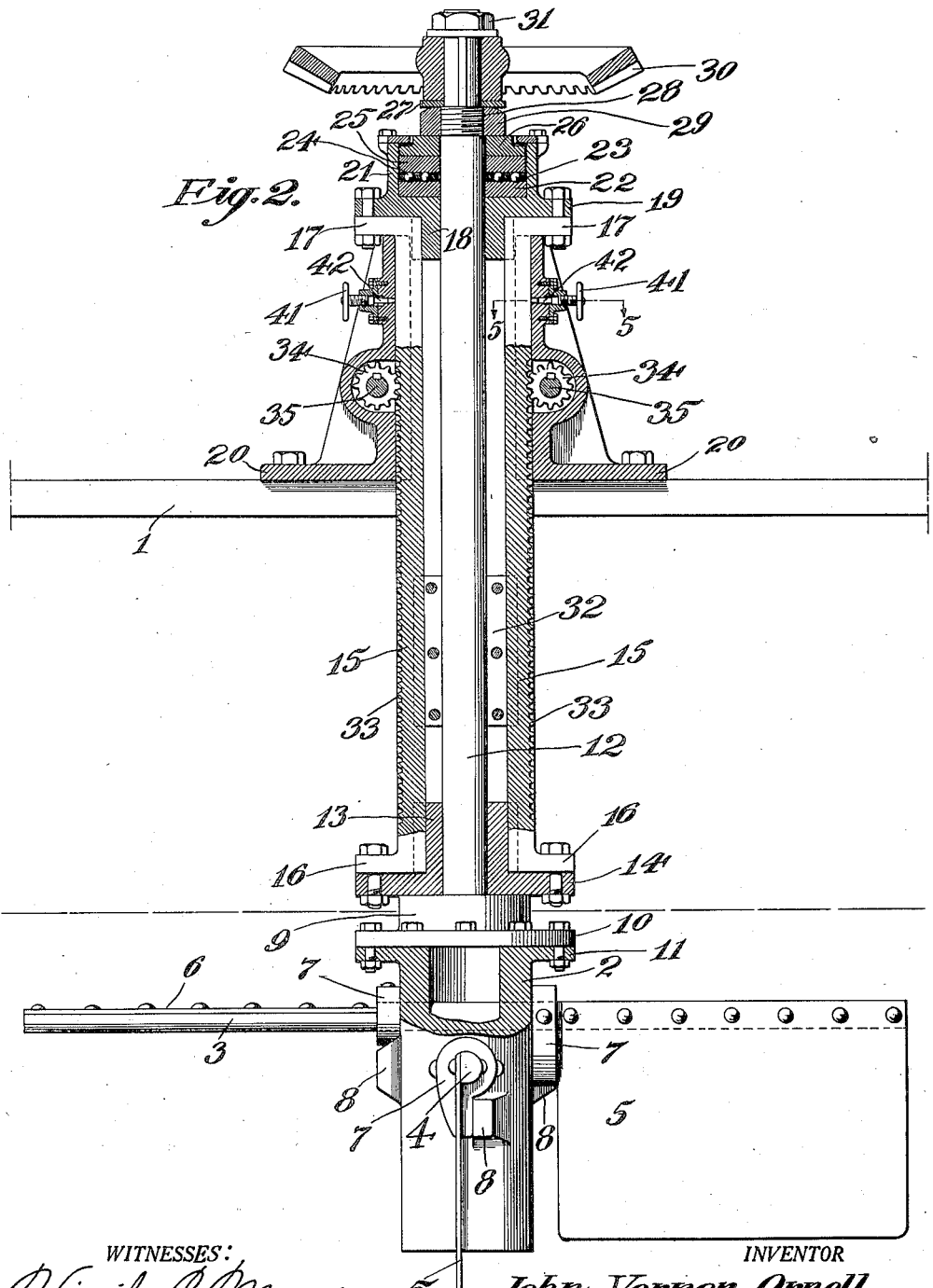

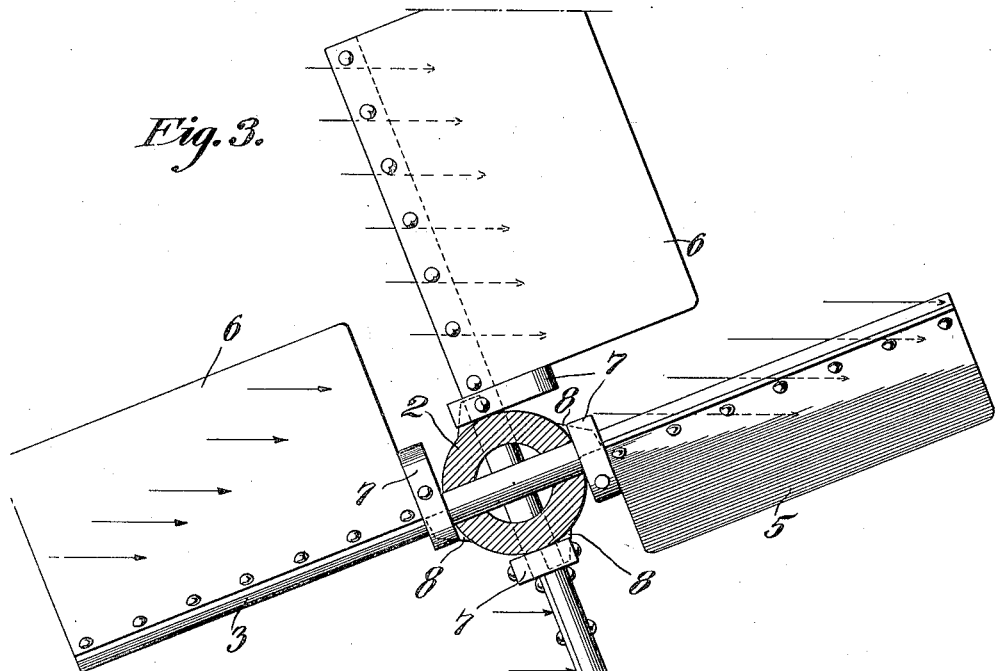
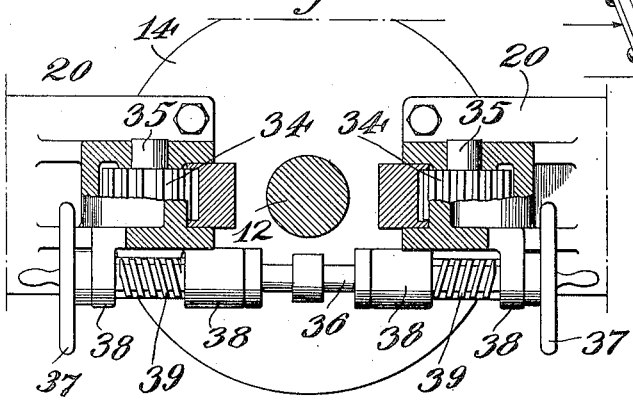
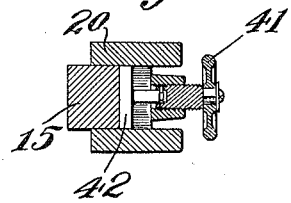

1,567,859

UNITED STATES PATENT OFFICE.

JOHN VERNER ORNELL, OF PHILADELPHIA, PENNSYLVANIA.

MEANS FOR UTILIZING POWER FROM STREAMS.

Application filed November 14, 1924. Serial No. 749,832.

*To all whom it may concern:*

Be it known that I, JOHN VERNER ORNELL, a subject of the King of Sweden, residing at Philadelphia, in the county of Philadelphia and State of Pennsylvania, have invented certain new and useful Improvements in Means for Utilizing Power from Streams, of which the following is a specification.

My invention relates to novel means for converting power derived from the flow of a stream into rotary motion whereby it may be used for driving dynamos or other mechanism, and the object of my invention is to provide simple and effective mechanism for this purpose.

This object, and other advantageous ends which will be described hereinafter, I attain in the following manner, reference being had to the accompanying drawings in which Figure 1 is a view in elevation of mechanism embodying my invention and showing it in position for use, Figure 2 a vertical section of the same but showing some parts in elevation, Figure 3 a cross section on line 3—3 of Figure 1, Figure 4 a section on line 4—4 of Figure 1, and Figure 5 a section on line 5—5 of Figure 2.

Referring to the drawings, 1 indicates a platform, or anchored float, upon which the apparatus is mounted and by which it is supported, 2 a rotatable hub which, when in use, is suspended from the platform, 3 and 4 shafts rockably mounted in the hub at right angles to each other, each shaft extending a substantial distance from the hub in opposite directions, 5 and 6 blades or wings fixed respectively to the oppositely extending parts of the shafts and extending in planes at right angles to each other, 7 reinforcing bosses fixed to the inner ends of the blades and preferably provided with flat surfaces adapted to engage lugs 8 extending from the hub, 9 a collar having a flange 10 fixed to a flange 11 extending from the hub, 12 a shaft fixed in collar 9, and 13 a collar resting upon collar 9, having a flange 14 and serving as the lower bearing for shaft 12. Upwardly extending standards 15 are provided, at their ends, with outwardly extending lugs 16 and 17. Lugs 16 are bolted to flange 14 on collar 13 and lugs 17 support a collar 18 having a peripheral flange 19 to which the lugs are bolted, the collar forming the upper bearing for shaft 12. The standards are supported by columns 20 fixed to platform 1 and extending upwardly into engagement with lugs 17. Collar 18 has an upwardly extending annular flange 21 forming the outer wall of a chamber which houses a stepped ball bearing which preferably consists of an annular plate 22, an annular plate 23 having sockets for balls 24, an annular plate 25 resting on the balls and a follower plate 26. Shaft 12 is threaded at 28 to receive a nut 29 which rests upon the follower plate and supports the shaft. A gear wheel 30 is splined to the upper end of the shaft and held in place thereon by a nut 31. A washer 27 is interposed between nut 29 and the hub of gear 30. Standards 15 are preferably connected by brace plates 32 which partly encircle the shaft.

In their outer faces standards 15 are provided with racks 33. Pinions 34 fixed to shafts 35 having their bearings in columns 20 mesh with the racks and may be actuated by a shaft 36 provided with hand wheels 37, the shaft having a bearing 38 on each of the brackets and having worms 39 fixed thereto which mesh with worm wheels 40 fixed to shafts 35. When in use the hub and the blades carried thereby are beneath the surface of the stream but, by actuating the hand wheels the hub and the parts connected therewith may be raised to bring it above the surface of the stream, or may be lowered into position beneath the surface, and may be locked in selected position by hand screws 41 connected with dogs 42 slidable in recesses in columns 20 and adapted to take between the teeth of the racks.

I have illustrated the device as equipped with but two blade-carrying shafts but it is obvious that the number may be increased when the depth of the stream is sufficient to permit their use.

In operation, with the flow of the stream coming from the left and a blade 5 on shaft 3 in vertical position with its reinforcing boss 7 in engagement with a lug 8 on the hub, as shown in Figure 2, blade 6 on the other end of shaft 3 will be in horizontal position. The force imparted by the current, acting upon one face of the vertical blade, will swing shaft 3 in anti-clockwise direction, thereby imparting rotary motion, in the same direction, to the hub. The current will also have a tendency to tilt the vertical blade upwardly, but this tendency will be resisted by lug 8. Meantime blade 6 on the same shaft will be extended in a horizontal plane and will also be traveling in anti-clockwise direction but offering slight resistance to the current. When the shaft 3 has been swung 90° blade 5 will be extended in line with the current, or in neutral position. Continued rotation of the hub will carry the blade past the neutral position and bring its other face in opposition to the current, but the blade, being free to swing rearwardly will be swung into horizontal position thereby rocking the shaft and tilting blade 6, which will also be just passing the neutral line, into vertical position where it will in turn be positively engaged by the current. Shaft 4 and its blades operate in the same way and the shafts with their blades impart a continuous rotary motion to hub 2 and through shaft 12 to gear wheel 30.

While I have described my invention as taking a particular form, it will be understood that the various parts may be changed without departing from the spirit thereof, and hence I do not limit myself to the precise construction set forth, but consider that I am at liberty to make such changes and alterations as fairly come within the scope of the appended claim.

Having thus described my invention, what I claim as new and desire to secure by Letters Patent is:—

Means for converting power derived from the flow of a stream into rotary motion including a rotatable and vertically movable hub; rock shafts mounted in the hub and extending therefrom in both directions; a blade fixed to each extending part of the rock shafts, the blade on one extending part being disposed in a plane at right angles to the blade on the other part; a collar fixed to the hub; a shaft fixed to the collar; a second collar resting upon the first named collar serving as a bearing for the shaft; standards fixed to the second collar; a collar fixed to the standards serving as a second bearing for the shaft, the standards having racks arranged longitudinally thereon; columns supporting the standards; gearing carried by the columns meshing with the racks, means for actuating the gearing; and releasable locking dogs arranged to engage the teeth of said racks.

In testimony whereof I have signed my name to this specification.

JOHN VERNER ORNELL.